(12) United States Patent
Katsu et al.

(10) Patent No.: US 11,768,154 B2
(45) Date of Patent: Sep. 26, 2023

(54) FOURIER TRANSFORM INFRARED SPECTROPHOTOMETER

(71) Applicant: Shimadzu Corporation, Kyoto (JP)

(72) Inventors: Hideaki Katsu, Kyoto (JP); Takashi Muramatsu, Kyoto (JP); Hiromasa Maruno, Kyoto (JP); Naoji Moriya, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 56 days.

(21) Appl. No.: 17/670,920

(22) Filed: Feb. 14, 2022

(65) Prior Publication Data

US 2022/0260485 A1    Aug. 18, 2022

(30) Foreign Application Priority Data

Feb. 17, 2021   (JP) ................................. 2021-023190

(51) Int. Cl.
*G01N 21/35* (2014.01)

(52) U.S. Cl.
CPC ..... *G01N 21/35* (2013.01); *G01N 2021/3595* (2013.01); *G01N 2201/0633* (2013.01); *G01N 2201/0636* (2013.01)

(58) Field of Classification Search
CPC ........... G01N 21/35; G01N 2021/3595; G01N 2201/0633; G01N 2201/0636; G01N 21/01; G01J 3/0208; G01J 3/4535
See application file for complete search history.

(56) References Cited

U.S. PATENT DOCUMENTS

| | | | |
|---|---|---|---|
| 6,323,972 B1 * | 11/2001 | Taylor ..................... | G03H 1/16 359/2 |
| 7,095,507 B1 * | 8/2006 | Hwang .............. | G01B 11/2441 356/512 |
| 2010/0309485 A1 * | 12/2010 | Kauppinen ........ | G01B 9/02057 356/615 |
| 2013/0222790 A1 | 8/2013 | Hirao | |

FOREIGN PATENT DOCUMENTS

| | | |
|---|---|---|
| JP | S64-013426 A | 1/1989 |
| JP | H02-253103 A | 10/1990 |
| WO | 2012/056813 A1 | 5/2012 |

\* cited by examiner

*Primary Examiner* — Marcus H Taningco
(74) *Attorney, Agent, or Firm* — Muir Patent Law, PLLC (57) ABSTRACT

A Fourier transform infrared spectrophotometer includes a main interfersometer, a control interferometer, an infrared detector, a control light detector, and a beam splitter block. The beam splitter block is disposed between a beam splitter and the control light detector. The control light detector has an optical axis inclined with respect to an optical axis of a control interference light beam.

10 Claims, 4 Drawing Sheets

FOURIER TRANSFORM INFRARED SPECTROPHOTOMETER

BACKGROUND OF THE INVENTION

Field of the Invention

The present disclosure relates to a Fourier transform infrared spectrophotometer.

Description of the Background Art

For example, a Fourier transform infrared spectrophotometer disclosed in Japanese Patent Laying-Open No. 02-253103 includes an infrared light source, a beam splitter, a fixed mirror, and a moving mirror which constitute a two-beam interferometer. A laser beam for determining an orientation of the fixed mirror or the moving mirror is introduced into the two-beam interferometer.

SUMMARY OF THE INVENTION

An object of the present disclosure is to provide a Fourier transform infrared spectrophotometer that can obtain a more accurate interferogram.

A Fourier transform infrared spectrophotometer of an aspect of the present disclosure includes a main interferometer, a control interferometer, an infrared detector, a control light detector, and a beam splitter block. The main interferometer includes an infrared light source that emits an infrared light beam, a beam splitter, a fixed mirror, and a moving mirror. The control interferometer includes a control light source that emits a control light beam, the beam splitter, the fixed mirror, and the moving mirror. The infrared detector detects an infrared interference light beam that is generated by the main interferometer and passes through a sample or is reflected by the sample. The control light detector detects a control interference light beam generated by the control interferometer. The beam splitter block is disposed on an optical path of the control interference light beam and is disposed between the beam splitter and the control light detector. The control light detector has an incident surface, the incident surface having a normal line inclined with respect to an optical axis of the control interference light beam.

A Fourier transform infrared spectrophotometer according to an aspect of the present disclosure includes a main interferometer, a control interferometer, an infrared detector, a control light detector, and at least one of a collimation optical system or a waveplate. The main interferometer includes an infrared light source that emits an infrared light beam, a beam splitter, a fixed mirror, and a moving mirror. The control interferometer includes a control light source that emits a control light beam, the beam splitter, the fixed mirror, and the moving mirror. The infrared detector detects an infrared interference light beam that is generated by the main interferometer and passes through a sample or is reflected by the sample. The control light detector detects a control interference light beam generated by the control interferometer. The at least one of the collimation optical system or the waveplate is disposed on an optical path of the control light beam. The collimation optical system is disposed between the control light source and the beam splitter. The waveplate is disposed between the moving mirror and the beam splitter or between the fixed mirror and the beam splitter. The at least one of the collimation optical system or the waveplate has an optical axis inclined with respect to an optical axis of the control light beam.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present disclosure will be described below. The same or corresponding parts have the same reference characters allotted, and description thereof will not be repeated.

A Fourier transform infrared spectrophotometer 1 of an embodiment will be described with reference to FIGS. 1 to 6. Fourier transform infrared spectrophotometer 1 mainly includes a main interferometer 6, a control interferometer 7, an infrared detector 19, a control light detector 34, a mirror angle adjuster 45, a mirror drive 47, a controller 50, and a spectrum generator 60. Fourier transform infrared spectrophotometer 1 may further include a beam splitter block 30. Fourier transform infrared spectrophotometer 1 may further include at least one of a collimation optical system 22 or a waveplate 27. Fourier transform infrared spectrophotometer 1 may further include apertures 25, 42, 43.

Figure 1:
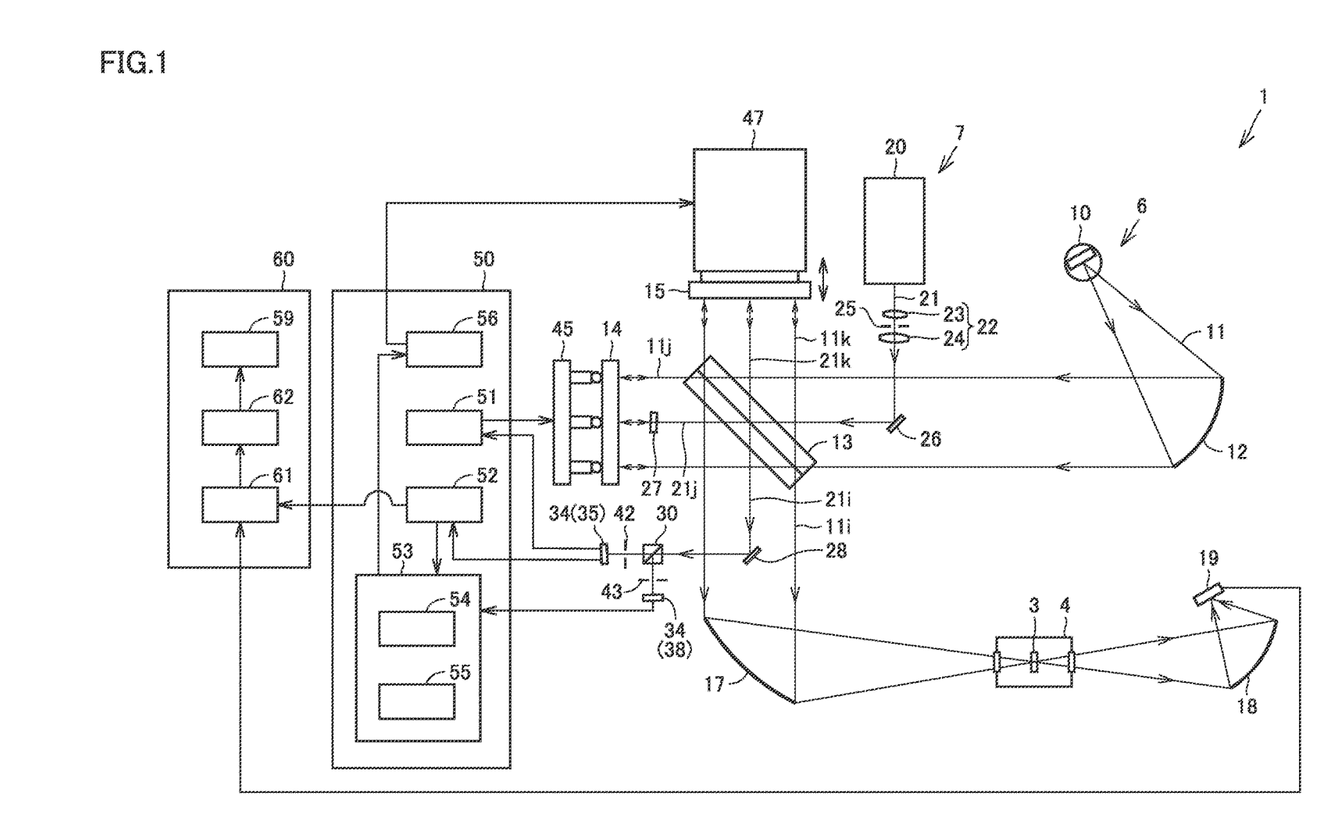
FIG. 1 is a schematic view of a Fourier transform infrared spectrophotometer of an embodiment.

Main interferometer 6 generates an infrared interference light beam 11$i$ for measuring a power spectrum of a sample 3. Referring to FIG. 1, main interferometer 6 includes an infrared light source 10, a beam splitter 13, a fixed mirror 14, and a moving mirror 15. Main interferometer 6 may further include a collimation mirror 12.

Infrared light source 10 emits an infrared light beam 11. Infrared light source 10 is, for example, a ceramic light source. Collimation mirror 12 reflects infrared light beam 11 toward beam splitter 13 and collimates infrared light beam 11.

Beam splitter 13 splits infrared light beam 11 into a first infrared light beam 11$j$ toward fixed mirror 14 and a second infrared light beam 11$k$ toward moving mirror 15. Beam splitter 13 combines first infrared light beam 11$j$ reflected by fixed mirror 14 and second infrared light beam 11$k$ reflected by moving mirror 15. Main interferometer 6 (beam splitter 13) generates infrared interference light beam 11$i$ that is an interference light beam between first infrared light beam 11$j$ and second infrared light beam 11k, and emits infrared interference light beam 11i toward sample 3 and infrared detector 19.

Mirror drive 47 is connected to moving mirror 15. Mirror drive 47 moves moving mirror 15 so as to be close to beam splitter 13 and be distant from beam splitter 13, thereby causing moving mirror 15 to reciprocate. Mirror drive 47 may include, for example, a linear guide (not shown) and a voice coil motor (not shown). The linear guide includes a rail (not shown) and a slider (not shown) to which moving mirror 15 is attached and which slides on the rail. The voice coil motor causes the slider to slide along the rail.

As moving mirror 15 moves, the orientation of moving mirror 15 (a normal direction of moving mirror 15) may vary. The variations in the orientation of moving mirror 15 change the intensity and the phase of infrared interference light beam 11i to deteriorate an interferogram detected by infrared detector 19. Thus, the orientation of moving mirror 15 or fixed mirror 14 needs to be adjusted to compensate for the variations in the orientation of moving mirror 15. Mirror angle adjuster 45 adjusts the orientation of moving mirror 15 or fixed mirror 14. In the present embodiment, mirror angle adjuster 45 is provided to fixed mirror 14 and adjusts the orientation of fixed mirror 14 (a normal direction of fixed mirror 14). Mirror angle adjuster 45 may be provided to moving mirror 15 and adjust the orientation of moving mirror 15 (the normal direction of moving mirror 15). Mirror angle adjuster 45 is, for example, an actuator including a piezoelectric element. Specifically, the orientation of the mirror can be adjusted by changing the shape of the piezoelectric element.

Infrared interference light beam 11i emitted from main interferometer 6 (beam splitter 13) is reflected and collected by a collector mirror 17 and enters sample 3 disposed in a sample chamber 4. Infrared interference light beam 11i passes through sample 3. Infrared interference light beam 11i may be reflected by sample 3. Infrared interference light beam 11i that passes through sample 3 or is reflected by sample 3 is reflected and collected by a collector mirror 18 and enters infrared detector 19. Infrared detector 19 detects, as an interferogram, infrared interference light beam 11i that is generated by main interferometer 6 and passes through sample 3 or is reflected by sample 3. The interferogram is generated as moving mirror 15 moves. Infrared detector 19 is, for example, an MCT detector.

Control interferometer 7 generates a control interference light beam 21i for determining the position and the speed of moving mirror 15 and the orientation of fixed mirror 14 or moving mirror 15. Referring to FIG. 1, control interferometer 7 includes a control light source 20, beam splitter 13, fixed mirror 14, and moving mirror 15.

Control light source 20 emits a control light beam 21. Control light source 20 is, for example, a laser light source such as a helium-neon (He—Ne) laser or a semiconductor laser. Control light beam 21 is, for example, a laser beam.

Collimation optical system 22 is disposed on an optical path of control light beam 21 and is disposed between control light source 20 and beam splitter 13. Collimation optical system 22 includes at least one lens (e.g., a first lens 23, a second lens 24). Collimation optical system 22 collimates control light beam 21.

Figure 2:
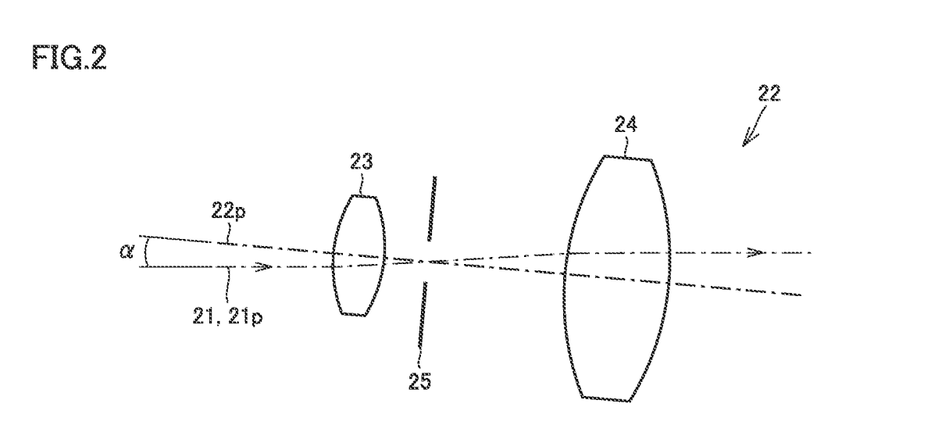
FIG. 2 is a partially enlarged schematic view of the Fourier transform infrared spectrophotometer of the embodiment.

As shown in FIG. 2, collimation optical system 22 has an optical axis 22p inclined with respect to an optical axis 21p of control light beam 21. A part of control light beam 21 emitted from control light source 20 is reflected off a surface of at least one lens of collimation optical system 22, thus causing stray light. This stray light is reflected off an exit surface of control light source 20 and travels toward control light detector 34. Inclining optical axis 22p of collimation optical system 22 with respect to optical axis 21p of control light beam 21 reduces or eliminates an overlap between the stray light and control interference light beam 21i on a light detection surface (light detection surface 36s, 39s) of control light detector 34. Particularly, inclining optical axis 22p of collimation optical system 22 with respect to optical axis 21p of control light beam 21 prevents the stray light from being incident on the light detection surface of control light detector 34.

Optical axis 22p of collimation optical system 22 is inclined with respect to optical axis 21p of control light beam 21 by, for example, an angle α of not less than 0.5°. Optical axis 22p of collimation optical system 22 may be inclined with respect to optical axis 21p of control light beam 21 by an angle α of not less than 1.0°. This more reliably reduces or eliminates an overlap between the stray light and control interference light beam 21i on the light detection surface (light detection surface 36s, 39s) of control light detector 34. Particularly, the stray light can be more reliably prevented from being incident on the light detection surface of control light detector 34. Optical axis 22p of collimation optical system 22 is inclined with respect to optical axis 21p of control light beam 21 by, for example, an angle α of not greater than 5.0°. Optical axis 22p of collimation optical system 22 may be inclined with respect to optical axis 21p of control light beam 21 by an angle α of not greater than 4.0°. Consequently, collimation optical system 22 is miniaturized, leading to miniaturized Fourier transform infrared spectrophotometer 1.

Collimation optical system 22 may be a beam expander. In other words, collimation optical system 22 may collimate control light beam 21 and expand the beam diameter of control light beam 21. Thus, the stray light from control interferometer 7 to control light source 20 can be eliminated to prevent the superposition of a harmonic on control interference light beam 21i. The speed of moving mirror 15 and the orientation of fixed mirror 14 or moving mirror 15 can be set more accurately, and the position of moving mirror 15 can be detected more accurately. Specifically, collimation optical system 22 may include first lens 23 and second lens 24. Collimation optical system 22 may be a Kepler beam expander shown in FIGS. 1 and 2 or a Galileo beam expander.

Collimation optical system 22 may further include aperture 25. As a part of control light beam 21 is reflected off the surface of at least one lens of collimation optical system 22, stray light is caused. Aperture 25 reduces or eliminates the stray light that reaches the exit surface of control light source 20. Thus, aperture 25 more reliably reduces or eliminates an overlap between the stray light and control interference light beam 21i on the light detection surface (light detection surface 36s, 39s) of control light detector 34. Particularly, aperture 25 prevents the stray light from being incident on the light detection surface of control light detector 34.

Figure 3:
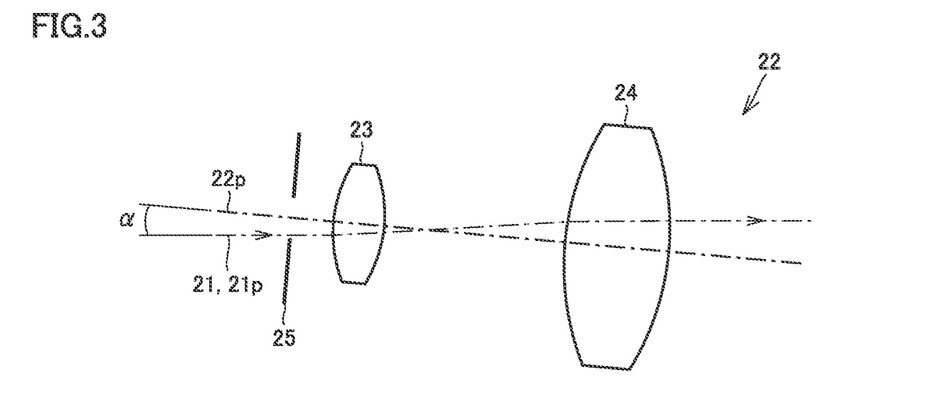
FIG. 3 is a partially enlarged schematic view of a Fourier transform infrared spectrophotometer of a variation of the embodiment.

As shown in FIGS. 1 and 2, aperture 25 may be disposed between first lens 23 and second lens 24. Particularly, aperture 25 may be disposed at a focal position of first lens 23 and second lens 24 on optical axis 22p of collimation optical system 22. As shown in FIG. 3, aperture 25 may be disposed on the control light source 20 side relative to collimation optical system 22 on optical axis 21p of control light beam 21.

As shown in FIG. 1, a mirror 26 reflects control light beam 21 emitted from collimation optical system 22 toward beam splitter 13. Mirror 26 may be disposed in infrared light beam 11. In order to reduce infrared light beam 11 blocked by mirror 26, mirror 26 has a size smaller than the beam diameter of infrared light beam 11. Control light beam 21 travels in parallel with infrared light beam 11 and enters beam splitter 13. Optical axis 21p of control light beam 21 is parallel to an optical axis 11p of infrared light beam 11. Control light beam 21 has a beam diameter smaller than the beam diameter of infrared light beam 11.

Beam splitter 13 splits control light beam 21 into a first control light beam 21j toward fixed mirror 14 and a second control light beam 21k toward moving mirror 15. Beam splitter 13 combines first control light beam 21j reflected by fixed mirror 14 and second control light beam 21k reflected by moving mirror 15. Control interferometer 7 (beam splitter 13) generates control interference light beam 21i that is an interference light beam between first control light beam 21j and second control light beam 21k, and emits control interference light beam 21i toward infrared detector 19.

Waveplate 27 is disposed on the optical path of control light beam 21. Waveplate 27 is disposed between fixed mirror 14 and beam splitter 13. Waveplate 27 may be disposed between moving mirror 15 and beam splitter 13. Waveplate 27 includes, for example, a surface 27a facing beam splitter 13 and a surface 27b opposite to surface 27a. Surface 27b faces a mirror (e.g., fixed mirror 14). Waveplate 27 is, for example, a ⅛ wavelength plate (λ/8 plate). For example, waveplate 27 converts control light beam 21 (first control light beam 21j) with linear polarization into control light beam 21 (first control light beam 21j) with circular polarization.

Figure 4:
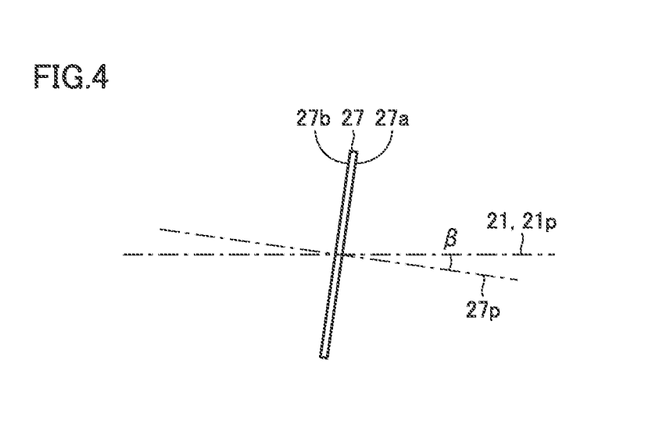
FIG. 4 is a partially enlarged schematic view of the Fourier transform infrared spectrophotometer of the embodiment.

Referring to FIG. 4, waveplate 27 has an optical axis 27p inclined with respect to optical axis 21p of control light beam 21. A part of control light beam 21 is reflected off surface 27a of waveplate 27, thus causing stray light. Inclining optical axis 27p of waveplate 27 with respect to optical axis 21p of control light beam 21 reduces or eliminates an overlap between the stray light and control interference light beam 21i on the light detection surface (light detection surface 36s, 39s) of control light detector 34. Particularly, inclining optical axis 27p of waveplate 27 with respect to optical axis 21p of control light beam 21 prevents the stray light from being incident on the light detection surface of control light detector 34.

A part of control light beam 21 reflected by a mirror (e.g., fixed mirror 14) is reflected off surface 27b of waveplate 27, thus causing stray light. The stray light is reflected by the mirror (e.g., fixed mirror 14) and travels toward control light detector 34. Inclining optical axis 27p of waveplate 27 with respect to optical axis 21p of control light beam 21 reduces or eliminates an overlap between the stray light and control interference light beam 21i on the light detection surface (light detection surface 36s, 39s) of control light detector 34. Particularly, inclining optical axis 27p of waveplate 27 with respect to optical axis 21p of control light beam 21 prevents the stray light from being incident on the light detection surface of control light detector 34.

Optical axis 27p of waveplate 27 is inclined with respect to optical axis 21p of control light beam 21 by, for example, an angle β of not less than 0.5°. Optical axis 27p of waveplate 27 may be inclined with respect to optical axis 21p of control light beam 21 by an angle β of not less than 1.0°. This more reliably reduces or eliminates an overlap between the stray light and control interference light beam 21i on the light detection surface (light detection surface 36s, 39s) of control light detector 34. Particularly, the stray light can be more reliably prevented from being incident on the light detection surface of control light detector 34.

Optical axis 27p of waveplate 27 is inclined with respect to optical axis 21p of control light beam 21 by, for example, an angle β of not greater than 5.0°. Optical axis 27p of waveplate 27 may be inclined with respect to optical axis 21p of control light beam 21 by an angle of not greater than 4.0°. Accordingly, Fourier transform infrared spectrophotometer 1 is miniaturized.

Control interference light beam 21i emitted from control interferometer 7 (beam splitter 13) travels in parallel with infrared interference light beam 11i and is incident on mirror 28. Mirror 28 may be disposed in infrared interference light beam 11i. In order to reduce infrared interference light beam 11p blocked by mirror 28, mirror 28 has a size smaller than the beam diameter of infrared interference light beam 11i. Control interference light beam 21i has a beam diameter smaller than the beam diameter of infrared interference light beam 11i. Control interference light beam 21i is reflected by mirror 28 and enters control light detector 34.

Control light detector 34 detects control interference light beam 21i generated by control interferometer 7. Specifically, control light detector 34 includes a first control light detector 35 and a second control light detector 38.

Beam splitter block 30 is disposed on an optical path of control interference light beam 21i and is disposed between beam splitter 13 and control light detector 34. Control interference light beam 21i reflected by mirror 28 enters beam splitter block 30. Beam splitter block 30 is, for example, a polarizing beam splitter. Beam splitter block 30 splits control interference light beam 21i into a first control interference light beam 21s and a second control interference light beam 21t. When beam splitter block 30 is a polarizing beam splitter, first control interference light beam 21s is, for example, an s-polarized component of control interference light beam 21i, and second control interference light beam 21t is, for example, a p-polarized component of control interference light beam 21i.

Figure 6:
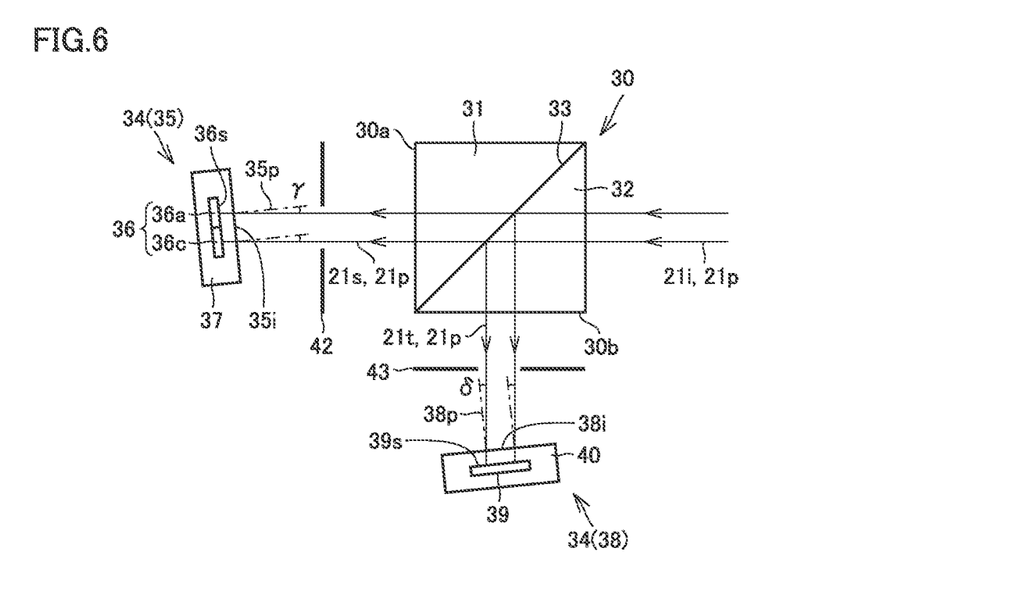
FIG. 6 is a partially enlarged schematic view of the Fourier transform infrared spectrophotometer of the embodiment.

Beam splitter block 30 includes transparent blocks 31, 32, and a light separation film 33 such as a polarization separation film. Light separation film 33 is, for example, a dielectric multilayer film. Light separation film 33 is provided between transparent block 31 and transparent block 32. Beam splitter block 30 includes surfaces 30a, 30b. First control interference light beam 21s is emitted from surface 30a toward first control light detector 35. Surface 30a is, for example, perpendicular to optical axis 21p of control interference light beam 21i (first control interference light beam 21s). Second control interference light beam 21t is emitted from surface 30b toward second control light detector 38. Surface 30b is, for example, perpendicular to optical axis 21p of control interference light beam 21i (second control interference light beam 21t).

Figure 5:
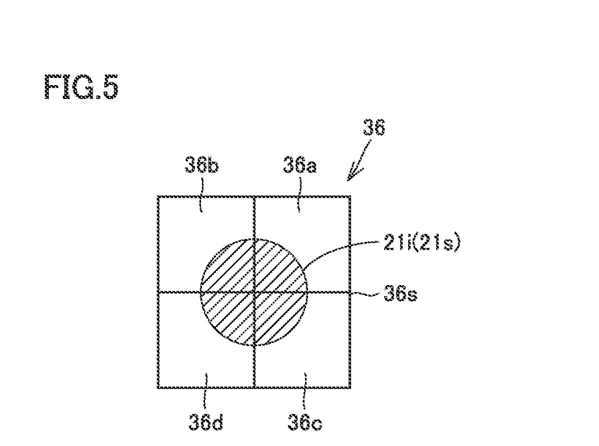
FIG. 5 is an enlarged schematic plan view of a light detection surface of a first control light detector included in the Fourier transform infrared spectrophotometer of the embodiment.

First control light detector 35 detects first control interference light beam 21s. Referring to FIGS. 5 and 6, first control light detector 35 includes a light receiving element 36 and an envelope 37.

Light receiving element 36 includes a light detection surface 36s on which first control interference light beam 21s is incident. Light detection surface 36s of light receiving element 36 is a light detection surface of first control light detector 35. Light receiving element 36 is, for example, a photodiode. More specifically, light receiving element 36 may be a multisegmented photodiode (e.g., quadrant photodiode) including a plurality of photodetection elements 36a, 36b, 36c, 36d. Photodetection elements 36a, 36b, 36c, 36d may be formed on a single semiconductor substrate.

Light receiving element 36 is disposed in envelope 37. Envelope 37 may be, for example, a sealing member that seals light receiving element 36 or a case that houses light receiving element 36. First control light detector 35 includes an incident surface 35i on which first control interference light beam 21s is incident. Incident surface 35i of first control light detector 35 is, for example, an incident surface of envelope 37. Incident surface 35i of first control light detector 35 is, for example, an incident surface of the sealing member or a light entrance window of the case.

Second control light detector 38 detects second control interference light beam 21t. Referring to FIG. 6, second control light detector 38 includes a light receiving element 39 and an envelope 40.

Light receiving element 39 includes a light detection surface 39s on which second control interference light beam 21t is incident. Light detection surface 39s of light receiving element 39 is a light detection surface of second control light detector 38. Light receiving element 39 is, for example, a photodiode. More specifically, light receiving element 39 may be a single-element photodiode including a single photodetection element.

Light receiving element 39 is disposed in envelope 40. Envelope 40 may be, for example, a sealing member that seals light receiving element 39 or a case that houses light receiving element 39. Second control light detector 38 includes an incident surface 38i on which second control interference light beam 21t is incident. Incident surface 38i of second control light detector 38 is, for example, an incident surface of envelope 40. Incident surface 38i of second control light detector 38 is, for example, an incident surface of the sealing member or a light entrance window of the case.

Referring to FIG. 6, control light detector 34 (first control light detector 35, second control light detector 38) has an incident surface (e.g., incident surface 35i, 38i), and the incident surface has a normal line (e.g., normal line 35p, 38p) inclined with respect to optical axis 21p of control interference light beam 21i. A part of control interference light beam 21i is reflected off the incident surface of control light detector 34, thus causing stray light. The stray light is reflected off the surface (e.g., surface 30a, 30b) of beam splitter block 30 and travels toward control light detector 34. Inclining the normal line of the incident surface of control light detector 34 with respect to optical axis 21p of control light beam 21 reduces or eliminates an overlap between the stray light and control interference light beam 21i on the light detection surface (light detection surface 36s, 39s) of control light detector 34. Particularly, inclining the normal line of the incident surface of control light detector 34 with respect to optical axis 21p of control light beam 21 prevents the stray light from being incident on the light detection surface of control light detector 34.

The normal line (e.g., normal line 35p, 38p) of the incident surface (e.g., incident surface 35i, 38i) of control light detector 34 (first control light detector 35, second control light detector 38) is inclined with respect to optical axis 21p of control interference light beam 21i by, for example, an angle of not less than 0.5°. The normal line of the incident surface of control light detector 34 may be inclined with respect to optical axis 21p of control interference light beam 21i by an angle of not less than 1.0°. This more reliably reduces or eliminates an overlap between the stray light and control interference light beam 21i on the light detection surface (light detection surface 36s, 39s) of control light detector 34. Particularly, the stray light can be more reliably prevented from being incident on the light detection surface of control light detector 34. The normal line of the incident surface of control light detector 34 is inclined with respect to optical axis 21p of control interference light beam 21i by, for example, an angle of not greater than 5.0°. The normal line of the incident surface of control light detector 34 may be inclined with respect to optical axis 21p of control interference light beam 21i by an angle of not greater than 4.0°. Accordingly, a laser-detection optical system including control light detector 34 and beam splitter block 30 is miniaturized, leading to miniaturized Fourier transform infrared spectrophotometer 1.

Specifically, normal line 35p of incident surface 35i of first control light detector 35 is inclined with respect to optical axis 21p of first control interference light beam 21s. A part of first control interference light beam 21s is reflected off incident surface 35i of first control light detector 35, thus causing stray light. The stray light is reflected off surface 30a of beam splitter block 30 and travels toward first control light detector 35. Inclining normal line 35p of incident surface 35i of first control light detector 35 with respect to optical axis 21p of first control interference light beam 21s reduces or eliminates an overlap between the stray light and first control interference light beam 21s on the light detection surface (light detection surface 36s) of first control light detector 35. Particularly, inclining normal line 35p of incident surface 35i of first control light detector 35 with respect to optical axis 21p of first control interference light beam 21s prevents the stray light from being incident on the light detection surface of first control light detector 35.

Normal line 35p of incident surface 35i of first control light detector 35 is inclined with respect to optical axis 21p of first control interference light beam 21s by, for example, an angle γ of not less than 0.5°. Normal line 35p of incident surface 35i of first control light detector 35 may be inclined with respect to optical axis 21p of first control interference light beam 21s by an angle γ of not less than 1.0°. This more reliably reduces or eliminates an overlap between the stray light and first control interference light beam 21s on the light detection surface (light detection surface 36s) of first control light detector 35. Particularly, the stray light can be more reliably prevented from being incident on the light detection surface of first control light detector 35. Normal line 35p of incident surface 35i of first control light detector 35 is inclined with respect to optical axis 21p of first control interference light beam 21s by, for example, an angle γ of not greater than 5.0°. Normal line 35p of incident surface 35i of first control light detector 35 may be inclined with respect to optical axis 21p of first control interference light beam 21s by, for example, an angle γ of not greater than 4.0°. Accordingly, the laser-detection optical system including control light detector 34 and beam splitter block 30 is miniaturized, leading to miniaturized Fourier transform infrared spectrophotometer 1.

Normal line 38p of incident surface 38i of second control light detector 38 is inclined with respect to optical axis 21p of second control interference light beam 21t. A part of second control interference light beam 21t is reflected off incident surface 38i of second control light detector 38, thus causing stray light. The stray light is reflected off surface 30b of beam splitter block 30 and travels toward second control light detector 38. Inclining normal line 38p of incident surface 38i of second control light detector 38 with respect to optical axis 21p of second control interference light beam 21t reduces or eliminates an overlap between the stray light and second control interference light beam 21t on the light detection surface (light detection surface 39s) of second control light detector 38. Particularly, inclining normal line 38p of incident surface 38i of second control light detector 38 with respect to optical axis 21p of second control interference light beam 21*t* prevents the stray light from being incident on the light detection surface of second control light detector 38.

Normal line 38*p* of incident surface 38*i* of second control light detector 38 is inclined with respect to optical axis 21*p* of second control interference light beam 21*t* by, for example, an angle δ of not less than 0.5°. Normal line 38*p* of incident surface 38*i* of second control light detector 38 may be inclined with respect to optical axis 21*p* of second control interference light beam 21*t* by an angle δ of not less than 1.0°. This more reliably reduces or prevents an overlap between the stray light and second control interference light beam 21*t* on the light detection surface (light detection surface 39*s*) of second control light detector 38. Particularly, the stray light can be more reliably prevented from being incident on the light detection surface of second control light detector 38. Normal line 38*p* of incident surface 38*i* of second control light detector 38 is inclined with respect to optical axis 21*p* of second control interference light beam 21*t* by, for example, an angle δ of not greater than 5.0°. Normal line 38*p* of incident surface 38*i* of second control light detector 38 may be inclined with respect to optical axis 21*p* of second control interference light beam 21*t* by an angle δ of not greater than 4.0°. Accordingly, the laser-detection optical system including control light detector 34 and beam splitter block 30 is miniaturized, leading to miniaturized Fourier transform infrared spectrophotometer 1.

Aperture 42, 43 may be disposed between beam splitter block 30 and control light detector 34. A part of control interference light beam 21*i* is reflected off the incident surface (e.g., incident surface 35*i*, 38*i*) of control light detector 34, thus causing stray light. Aperture 42, 43 reduces or eliminates the stray light that reaches the surface (e.g., 30*a*, 30*b*) of beam splitter block 30. Aperture 42, 43 thus more reliably reduces or eliminates an overlap between the stray light and control interference light beam 21*i* on the light detection surface (e.g., light detection surface 36*s*, 39*s*) of control light detector 34. Particularly, aperture 42, 43 more reliably prevents the stray light from being incident on the light detection surface of control light detector 34.

Specifically, aperture 42 may be disposed between beam splitter block 30 and first control light detector 35. A part of first control interference light beam 21*s* is reflected off incident surface 35*i* of first control light detector 35, thus causing stray light. Aperture 42 reduces or eliminates the stray light that reaches surface 30*a* of beam splitter block 30. Accordingly, aperture 42 more reliably reduces or eliminates an overlap between the stray light and first control interference light beam 21*s* on the light detection surface (light detection surface 36*s*) of first control light detector 35. Particularly, aperture 42 more reliably prevents the stray light from being incident on the light detection surface of first control light detector 35.

Aperture 43 may be disposed between beam splitter block 30 and second control light detector 38. A part of second control interference light beam 21*t* is reflected off incident surface 38*i* of second control light detector 38, thus causing stray light. Aperture 43 reduces or eliminates the stray light that reaches surface 30*b* of beam splitter block 30. Aperture 43 thus more reliably reduces or eliminates an overlap between the stray light and second control interference light beam 21*t* on the light detection surface (light detection surface 39*s*) of second control light detector 38. Particularly, aperture 43 more reliably prevents the stray light from being incident on the light detection surface of second control light detector 38.

Controller 50 is formed of, for example, at least one of a processor, such as a central processing unit (CPU), or an electric circuit. Controller 50 includes a mirror angle adjuster 51, a signal adder 52, a mirror position detector 53, and a mirror speed adjuster 56. Controller 50 may implement the functions of mirror angle adjuster 51, signal adder 52, mirror position detector 53, and mirror speed adjuster 56 as the processor executes a program stored in a storage unit (not shown) of controller 50.

Mirror angle adjuster 51 controls an operation of mirror angle adjuster 45 based on an output of control light detector 34, thereby adjusting the orientation of the mirror (e.g., fixed mirror 14). Specifically, mirror angle adjuster 51 adjusts the orientation of the mirror (e.g., fixed mirror 14) such that the phases of the output signals of photodetection elements 36*a*, 36*b*, 36*c*, 36*d* included in first control light detector 35 coincide with one another. Thus, variations in the orientation of moving mirror 15, which are caused as moving mirror 15 moves, are compensated for. An interferogram detected by infrared detector 19 can be improved.

Mirror position detector 53 detects the direction of moving of, and the position of, moving mirror 15 based on an output of control light detector 34. Specifically, mirror position detector 53 includes a waveform shaper 54 and an up/down counter 55. Signal adder 52 adds up the output signals of photodetection elements 36*a*, 36*b*, 36*c*, 36*d* included in first control light detector 35, thereby obtaining a first output signal of first control light detector 35. Mirror position detector 53 receives the first output signal of first control light detector 35 from signal adder 52 and receives a second output signal of second control light detector 38 from second control light detector 38. Waveform shaper 54 converts the first output signal of first control light detector 35 into a first pulse train signal. Waveform shaper 54 converts the second output signal of second control light detector 38 into a second pulse train signal.

Up/down counter 55 receives the first pulse train signal and the second pulse train signal from waveform shaper 54. Up/down counter 55 specifies the direction of moving of moving mirror 15 from the phase relationship between a first phase of the first pulse train signal and a second phase of the second pulse train signal. For example, when the first phase of the first pulse train signal is ahead of the second phase of the second pulse train signal by 90°, up/down counter 55 specifies the direction away from beam splitter 13 as the direction of moving of moving mirror 15. When the first phase of the first pulse train signal is behind the second phase of the second pulse train signal by 90°, up/down counter 55 specifies the direction away from beam splitter 13 as the direction of moving of moving mirror 15. The pulse number of pulse train signals which is counted by up/down counter 55 depends on the position of moving mirror 15. Mirror position detector 53 specifies the position of moving mirror 15 from the direction of moving of moving mirror 15 and the pulse number of pulse train signals which are obtained by up/down counter 55.

Mirror speed adjuster 56 controls mirror drive 47 to adjust the speed of moving of moving mirror 15. Specifically, mirror speed adjuster 56 controls mirror drive 47 such that the constant frequency of the first pulse train signal, obtained by mirror position detector 53, or the first output signal of first control light detector 35, obtained by signal adder 52, becomes constant. In this manner, mirror speed adjuster 56 moves moving mirror 15 at a constant speed.

Spectrum generator 60 is formed of, for example, at least one of a processor, such as a central processing unit (CPU), or an electric circuit. Controller 50 and spectrum generator 60 may be composed of one computer. Spectrum generator 60 includes a sample-and-hold unit 61, an analog-digital converter 62, and a Fourier transform operation unit 63. For example, spectrum generator 60 may implement the functions of sample-and-hold unit 61, analog-digital converter 62, and Fourier transform operation unit 63 as the processor executes a program stored in the storage unit (not shown) of controller 50.

Spectrum generator 60 generates a power spectrum of sample 3 from the interferogram detected by infrared detector 19. Specifically, the first pulse train signal or the second pulse train signal obtained by mirror position detector 53 is input to sample-and-hold unit 61. Sample-and-hold unit 61 samples the interferogram detected by infrared detector 19, at a timing defined by the first pulse train signal or the second pulse train signal. Analog-digital converter 62 digitally converts the sampled interferogram. Fourier transform operation unit 63 performs Fourier transform on the digitally converted interferogram. Thus, the power spectrum of sample 3 is obtained.

[Operation of Fourier Transform Infrared Spectrophotometer 1]

Description will be given of an operation of Fourier transform infrared spectrophotometer 1 in determination of the position and the speed of moving mirror 15 and the orientation of fixed mirror 14 or moving mirror 15. While moving mirror 15 is moving, the position and the speed of moving mirror 15 and the orientation of fixed mirror 14 or moving mirror 15 are monitored in real time.

Beam splitter block 30 splits control interference light beam 21$i$ emitted from control interferometer 7 into first control interference light beam 21$s$ and second control interference light beam 21$t$. First control light detector 35 detects first control interference light beam 21$s$. Second control light detector 38 detects second control interference light beam 21$t$. Mirror angle adjuster 51 adjusts, for example, the orientation of the mirror (e.g., moving mirror 15) such that the phases of the output signals of photodetection elements 36$a$, 36$b$, 36$c$, 36$d$ included in first control light detector 35 coincide with one another.

Signal adder 52 adds up the output signals of photodetection elements 36$a$, 36$b$, 36$c$, 36$d$ included in first control light detector 35, thereby obtaining the first output signal of first control light detector 35. Mirror position detector 53 receives the first output signal of first control light detector 35 from signal adder 52 and receives the second output signal of second control light detector 38 from second control light detector 38. Waveform shaper 54 converts the first output signal of first control light detector 35 into the first pulse train signal. Waveform shaper 54 converts the second output signal of second control light detector 38 into the second pulse train signal.

Up/down counter 55 receives the first pulse train signal and the second pulse train signal from waveform shaper 54. Up/down counter 55 specifies the direction of moving of moving mirror 15 from the phase relationship between the first phase of the first pulse train signal and the second phase of the second pulse train signal. Mirror position detector 53 also specifies the position of moving mirror 15 from the direction of moving of moving mirror 15 and the pulse number of pulse train signals which are obtained by up/down counter 55.

Mirror speed adjuster 56 controls mirror drive 47 such that the constant frequency of the first pulse train signal, obtained by mirror position detector 53, or the output signal of first control light detector 35, obtained by signal adder 52, becomes constant. Thus, mirror speed adjuster 56 moves moving mirror 15 at a constant speed.

Description will be given of an operation of Fourier transform infrared spectrophotometer 1 in measurement of a power spectrum of sample 3.

Infrared interference light beam 11$i$ emitted from main interferometer 6 passes through sample 3 or is reflected by sample 3. Infrared detector 19 detects, as an interferogram, infrared interference light beam 11$i$ that passes through sample 3 or is reflected by sample 3. The interferogram is generated as moving mirror 15 moves. Spectrum generator 60 generates a power spectrum of sample 3 from the interferogram detected by infrared detector 19.

Specifically, the first pulse train signal or the second pulse train signal obtained by mirror position detector 53 is input to sample-and-hold unit 61. Sample-and-hold unit 61 samples the interferogram detected by infrared detector 19, at a timing defined by the first pulse train signal or the second pulse train signal. Analog-digital converter 62 digitally converts the sampled interferogram. Fourier transform operation unit 63 performs Fourier transform on the digitally converted interferogram. Thus, the power spectrum of sample 3 is obtained.

[Variation]

At least one of optical axis 22$p$ of collimation optical system 22, optical axis 27$p$ of waveplate 27, or the normal line (normal line 35$p$, 38$p$) of the incident surface (incident surface 35$i$, 38$i$) of control light detector 34 may be inclined with respect to optical axis 21$p$ of control light beam 21 or control interference light beam 21$i$. Second control light detector 38 may include a multisegmented photodiode including a plurality of photodetection elements. When second control light detector 38 is the multisegmented photodiode, signal adder 52 adds up the output signals of the plurality of photodetection elements included in second control light detector 38, thereby obtaining a second output signal of second control light detector 38. Mirror position detector 53 receives a second output signal of second control light detector 38 from signal adder 52. Waveplate 27 is not limited to a ⅛ wavelength plate ($\lambda/8$ plate) and may be a quarter wavelength plate ($\lambda/4$ plate) or a half-wavelength plate ($\lambda/2$ plate).

[Functions of the Present Embodiment]

According to the present embodiment, if stray light is caused in at least one of collimation optical system 22, waveplate 27, or control light detector 34, an overlap between the stray light and control interference light beam 21$i$ on the light detection surface (e.g., light detection surface 36$s$, 39$s$) of control light detector 34 can be reduced or eliminated. Particularly, the stray light can be prevented from being incident on the light detection surface of control light detector 34. Based on the output signal from control light detector 34, the speed of moving mirror 15 and the orientation of fixed mirror 14 or moving mirror 15 can be set more accurately, and the position of moving mirror 15 can be detected more accurately. As a result, a stable interferogram with smaller temporal changes can be obtained. A stable power spectrum with smaller temporal changes can be obtained.

[Aspects]

It will be appreciated by a person skilled in the art that the exemplary embodiment described above provides specific examples of the following aspects.

(Clause 1) A Fourier transform infrared spectrophotometer according to an aspect includes a main interferometer, a control interferometer, an infrared detector, a control light detector, and a beam splitter block. The main interferometer includes an infrared light source that emits an infrared light beam, a beam splitter, a fixed mirror, and a moving mirror. The control interferometer includes a control light source that emits a control light beam, the beam splitter, the fixed mirror, and the moving mirror. The infrared detector detects an infrared interference light beam that is generated by the main interferometer and passes through a sample or is reflected by the sample. The control light detector detects a control interference light beam generated by the control interferometer. The beam splitter block is disposed on an optical path of the control interference light beam and is disposed between the beam splitter and the control light detector. The control light detector has an incident surface, the incident surface having a normal line inclined with respect to an optical axis of the control interference light beam.

As a part of the control interference light beam is reflected off the incident surface of the control light detector, stray light is caused. The stray light is reflected off the surface of the beam splitter block and travels toward the control light detector. Inclining the normal line of the incident surface of the control light detector with respect to the optical axis of the control interference light beam can reduce or eliminate an overlap between the stray light and the control interference light beam on the light detection surface of the control light detector. Thus, while the moving mirror is moved, based on an output signal from the control light detector, the speed of the moving mirror and the orientation of the fixed mirror or the moving mirror can be set more accurately, and the position of the moving mirror can be detected more accurately. The Fourier transform infrared spectrophotometer can obtain a more accurate interferogram.

(Clause 2) The Fourier transform infrared spectrophotometer according to clause 1 further includes at least one of a collimation optical system or a waveplate. The at least one of the collimation optical system or the waveplate is disposed on the optical path of the control light beam. The collimation optical system is disposed between the control light source and the beam splitter. The waveplate is disposed between the moving mirror and the beam splitter or between the fixed mirror and the beam splitter. The at least one of the collimation optical system or the waveplate has an optical axis inclined with respect to an optical axis of the control light beam.

When the Fourier transform infrared spectrophotometer includes the collimation optical system, the Fourier transform infrared spectrophotometer exhibits the following effects. As a part of the control light beam is reflected off the surface of at least one lens of the collimation optical system, stray light is caused. The stray light is reflected off the exit surface of the control light source and travels toward the control light detector. Inclining the optical axis of the collimation optical system with respect to the optical axis of the control light beam can reduce or eliminate an overlap between the stray light and the control interference light beam on the light detection surface of the control light detector. Thus, while the moving mirror is moved, based on an output signal from the control light detector, the speed of the moving mirror and the orientation of the fixed mirror or the moving mirror can be set more accurately, and the position of the moving mirror can be detected more accurately. The Fourier transform infrared spectrophotometer can obtain a more accurate interferogram.

When the Fourier transform infrared spectrophotometer includes the waveplate, the Fourier transform infrared spectrophotometer exhibits the following effects. As a part of the control light beam is reflected off the surface of the waveplate, stray light is caused. Inclining the optical axis of the waveplate with respect to the optical axis of the control light beam can reduce or eliminate an overlap between the stray light and the control interference light beam on the light detection surface of the control light detector. Thus, while the moving mirror is moved, based on an output signal from the control light detector, the speed of the moving mirror and the orientation of the fixed mirror or the moving mirror can be set more accurately, and the position of the moving mirror can be detected more accurately. The Fourier transform infrared spectrophotometer can obtain a more accurate interferogram.

(Clause 3) The Fourier transform infrared spectrophotometer according to clause 1 or 2 further includes an aperture disposed between the beam splitter block and the control light detector.

As a part of the control interference light beam is reflected off the incident surface of the control light detector, stray light is caused. The aperture can reduce or eliminate the stray light that reaches the surface of the beam splitter block. Thus, the aperture can more reliably reduce or eliminate an overlap between the stray light and the control interference light beam on the light detection surface of the control light detector. Thus, while the moving mirror is moved, based on an output signal from the control light detector, the speed of the moving mirror and the orientation of the fixed mirror or the moving mirror can be set more accurately, and the position of the moving mirror can be detected more accurately. The Fourier transform infrared spectrophotometer can obtain a more accurate interferogram.

(Cause 4) In the Fourier transform infrared spectrophotometer according to any one of clauses 1 to 3, the normal line of the incident surface of the control light detector is inclined with respect to the optical axis of the control interference light beam by not less than 0.5° and not greater than 5.0°.

As a part of the control interference light beam is reflected off the incident surface of the control light detector, stray light is caused. The stray light is reflected off the surface of the beam splitter block and travels toward the control light detector. The normal line of the incident surface of the control light detector is inclined with respect to the optical axis of the control interference light beam by not less than 0.5°. This more reliably reduces or eliminates an overlap between the stray light and the control interference light beam on the light detection surface of the control light detector. The normal line of the incident surface of the control light detector is inclined with respect to the optical axis of the control interference light beam by not greater than 5.0°. Accordingly, the Fourier transform infrared spectrophotometer can be miniaturized.

(Cause 5) A Fourier transform infrared spectrophotometer according to an aspect includes a main interferometer, a control interferometer, an infrared detector, a control light detector, and at least one of a collimation optical system or a waveplate. The main interferometer includes an infrared light source that emits an infrared light beam, a beam splitter, a fixed mirror, and a moving mirror. The control interferometer includes a control light source that emits a control light beam, the beam splitter, the fixed mirror, and the moving mirror. The infrared detector detects an infrared interference light beam that is generated by the main interferometer and passes through a sample or is reflected by the sample. The control light detector detects a control interference light beam generated by the control interferometer. The at least one of the collimation optical system or the waveplate is disposed on an optical path of the control light beam.

The collimation optical system is disposed between the control light source and the beam splitter. The waveplate is disposed between the moving mirror and the beam splitter or between the fixed mirror and the beam splitter. The at least one of the collimation optical system or the waveplate has an optical axis inclined with respect to an optical axis of the control light beam.

When the Fourier transform infrared spectrophotometer includes the collimation optical system, the Fourier transform infrared spectrophotometer exhibits the following effects. As a part of the control light beam is reflected off the surface of at least one lens of the collimation optical system, stray light is caused. The stray light is reflected off the exit surface of the control light source and travels toward the control light detector. Inclining the optical axis of the collimation optical system with respect to the optical axis of the control light beam can reduce or eliminate an overlap between the stray light and the control interference light beam on the light detection surface of the control light detector. Thus, while the moving mirror is moved, based on an output signal from the control light detector, the speed of the moving mirror and the orientation of the fixed mirror or the moving mirror can be set more accurately, and the position of the moving mirror can be detected more accurately. The Fourier transform infrared spectrophotometer can obtain a more accurate interferogram.

When the Fourier transform infrared spectrophotometer includes the waveplate, the Fourier transform infrared spectrophotometer exhibits the following effects. As a part of the control light beam is reflected off the surface of the waveplate, stray light is caused. Inclining the optical axis of the waveplate with respect to the optical axis of the control light beam can reduce or eliminate an overlap between the stray light and the control interference light beam on the light detection surface of the control light detector. Thus, while the moving mirror is moved, based on an output signal from the control light detector, the speed of the moving mirror and the orientation of the fixed mirror or the moving mirror can be set more accurately, and the position of the moving mirror can be detected more accurately. The Fourier transform infrared spectrophotometer can obtain a more accurate interferogram.

(Clause 6) In the Fourier transform infrared spectrophotometer according to clause 2 or 5, the collimation optical system includes a first lens, a second lens, and an aperture disposed between the first lens and the second lens.

As a part of the control light beam is reflected off the surface of at least one lens of the collimation optical system, stray light is caused. The aperture can reduce or eliminate the stray light that reaches the exit surface of the control light source. Accordingly, the aperture can more reliably reduce or eliminate an overlap between the stray light and the control interference light beam on the light detection surface of the control light detector. Thus, while the moving mirror is moved, based on an output signal from the control light detector, the speed of the moving mirror and the orientation of the fixed mirror or the moving mirror can be set more accurately, and the position of the moving mirror can be detected more accurately. The Fourier transform infrared spectrophotometer can obtain a more accurate interferogram.

(Clause 7) In the Fourier transform infrared spectrophotometer according to clause 2, 5, or 6, the optical axis of at least one of the collimation optical system or the waveplate is inclined with respect to the optical axis of the control light beam by not less than 0.5° and not greater than 5.0°.

As a part of the control light beam is reflected off the surface of the optical axis of at least one of the collimation optical system or the waveplate, stray light is caused. The optical axis of the at least one of the collimation optical system or the waveplate is inclined with respect to the optical axis of the control light beam by not less than 0.5°. This more reliably reduces or eliminates an overlap between the stray light and the control interference light beam on the light detection surface of the control light detector. The optical axis of the at least one of the collimation optical system or the waveplate is inclined with respect to the optical axis of the control light beam by not greater than 5.0°. The Fourier transform infrared spectrophotometer can thus be miniaturized.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A Fourier transform infrared spectrophotometer comprising:
   a main interferometer including an infrared light source that emits an infrared light beam, a beam splitter, a fixed mirror, and a moving mirror;
   a control interferometer including a control light source that emits a control light beam, the beam splitter, the fixed mirror, and the moving mirror;
   an infrared detector that detects an infrared interference light beam that is generated by the main interferometer and passes through a sample or is reflected by the sample;
   a control light detector that detects a control interference light beam generated by the control interferometer; and
   a beam splitter block disposed on an optical path of the control interference light beam and disposed between the beam splitter and the control light detector,
   wherein the control light detector has an incident surface, the incident surface having a normal line inclined with respect to an optical axis of the control interference light beam.

2. The Fourier transform infrared spectrophotometer according to claim 1, further comprising at least one of a collimation optical system or a waveplate disposed on the optical path of the control light beam, wherein
   the collimation optical system includes at least one lens and is disposed between the control light source and the beam splitter,
   the waveplate is disposed between the moving mirror and the beam splitter or between the fixed mirror and the beam splitter, and
   the at least one of the collimation optical system or the waveplate has an optical axis inclined with respect to an optical axis of the control light beam.

3. The Fourier transform infrared spectrophotometer according to claim 2, wherein the collimation optical system includes a first lens, a second lens, and an aperture disposed between the first lens and the second lens.

4. The Fourier transform infrared spectrophotometer according to claim 3, wherein the optical axis of the at least one of the collimation optical system or the waveplate is inclined with respect to the optical axis of the control light beam by not less than 0.5° and not greater than 5.0°.

5. The Fourier transform infrared spectrophotometer according to claim 2, wherein the optical axis of the at least one of the collimation optical system or the waveplate is inclined with respect to the optical axis of the control light beam by not less than 0.5° and not greater than 5.0°.

6. The Fourier transform infrared spectrophotometer according to claim 1, further comprising an aperture disposed between the beam splitter block and the control light detector.

7. The Fourier transform infrared spectrophotometer according to claim 1, wherein the normal line of the incident surface of the control light detector is inclined with respect to the optical axis of the control interference light beam by not less than 0.5° and not greater than 5.0°.

8. A Fourier transform infrared spectrophotometer comprising:
- a main interferometer including an infrared light source that emits an infrared light beam, a beam splitter, a fixed mirror, and a moving mirror;
- a control interferometer including a control light source that emits a control light beam, the beam splitter, the fixed mirror, and the moving mirror;
- an infrared detector that detects an infrared interference light beam that is generated by the main interferometer and passes through a sample or is reflected by the sample;
- a control light detector that detects a control interference light beam generated by the control interferometer; and
- at least one of a collimation optical system or a waveplate disposed on an optical path of the control light beam, wherein
- the collimation optical system is disposed between the control light source and the beam splitter,
- the waveplate is disposed between the moving mirror and the beam splitter or between the fixed mirror and the beam splitter, and
- the at least one of the collimation optical system or the waveplate has an optical axis inclined with respect to an optical axis of the control light beam.

9. The Fourier transform infrared spectrophotometer according to claim 8, wherein the collimation optical system includes a first lens, a second lens, and an aperture disposed between the first lens and the second lens.

10. The Fourier transform infrared spectrophotometer according to claim 8, wherein the optical axis of the at least one of the collimation optical system or the waveplate is inclined with respect to the optical axis of the control light beam by not less than 0.5° and not greater than 5.0°.

* * * * *